UNITED STATES PATENT OFFICE.

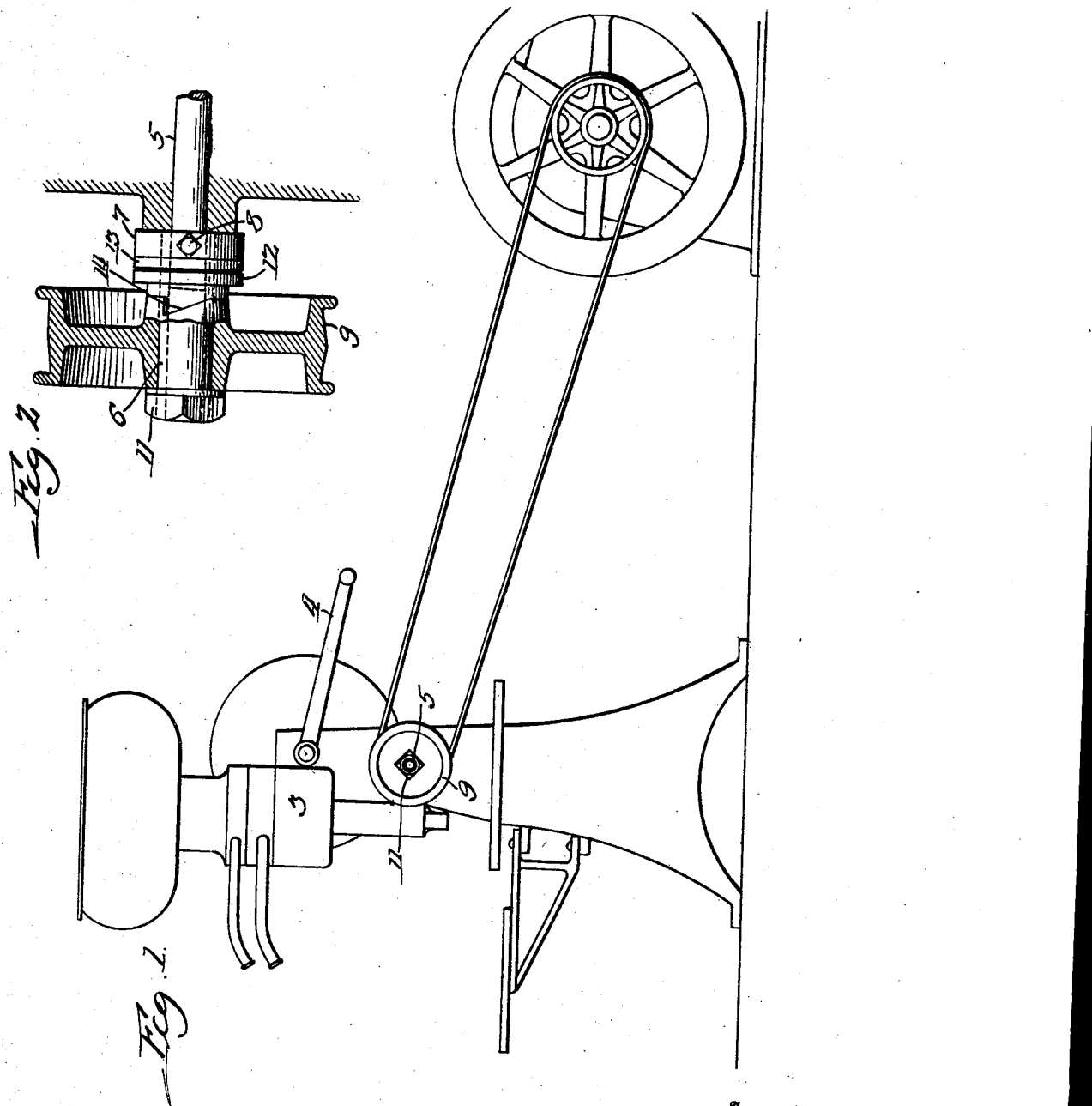

ARTHUR NEIL BRECKENRIDGE, OF ROCKFORD, ILLINOIS.

POWER-DRIVE FOR CREAM-SEPARATORS.

1,348,695.   Specification of Letters Patent.   Patented Aug. 3, 1920.

Application filed May 4, 1918. Serial No. 232,588.

*To all whom it may concern:*

Be it known that I, ARTHUR NEIL BRECKENRIDGE, a citizen of the United States, residing at Rockford, in the county of Winnebago and State of Illinois, have invented certain new and useful Improvements in Power - Drives for Cream - Separators, of which the following is a specification.

This invention pertains in general to driving cream separators by power, and has more particular reference to driving ordinary hand separators by such power as is derived from a gas engine or other power unit.

Since cream separators in general are designed for operation by hand, many difficulties are experienced in applying a power driving medium. It is most important that the transmission of power to a hand separator be uniform, regular and entirely free from shock or jerking motion. The speed of the separator must be uniform and regular in order that the separation may be complete at all times, and the working parts of the machine not subjected to undue strain and wear.

With these conditions in mind, I have devised a simple and improved means particularly adapted for transmitting power to a cream separator without detriment to the functions of the machine or to the operating parts thereof.

The construction, operation and attendant advantages of my improvements will be understood and appreciated by reference to the following description when considered in connection with the accompanying drawing, in which—

Figure 1 is an elevation of a cream separator equipped with my improved driving means driven from a gas engine; and Fig. 2, an enlarged detail view partly in section, illustrating the driving means.

It is well understood in the operation of cream separators that the application of power must be constant and not irregular and jerky as occasioned when the gas engine is connected to a separator through the agency of an ordinary ratchet toothed clutch. In the present invention, I have provided a very simple and automatically operating friction clutch particularly adapted for application to the lower driving shaft or worm gear shaft of a separator. This is exclusive of any manually operable shifting device or any parts requiring the attention of the operator. It is designed so that the separator may be operated by hand entirely independent of and without disturbing the power driving means; and at any time in the operation by hand the engine may be started and as soon as the engine speed exceeds that of the worm gear shaft, the power driven member or pulley will be gradually frictionally engaged with the separator driving shaft without the slightest strain or shock to the machine. Should at any time the speed of the engine drop below that of the separator driving shaft the friction driving connection will be automatically broken, allowing the separator to run under its own momentum.

In the present illustration of my improvements, I have taken as an example a conventional type of hand-operated cream separator designated in general by character 3. The separator may be driven by the usual hand crank 4 having a ratchet connection with the upper driving shaft. The lower or worm driving shaft 5 is the one to which my improvements are applied. As shown in Fig. 2, the shaft 5 projects from its bearing in the separator frame. On this projecting end is removably mounted my improved friction pulley unit. In its present exemplification this comprises a tubular shaft or driving member 6 telescoped on the projecting end of the shaft 5 and equipped with an annular collar 7 provided with a set screw 8 passing through an aperture in the member 6 and engaging the shaft 5 for rigidly securing the driving member 6 thereto. A suitable belt pulley 9 freely revoluble upon the member 6, is held against longitudinal movement thereon away from the collar 7 by suitable means, such for example as a nut 11 threadingly engaged on the outer end of the member 6. Interposed between the hub of the pulley and the collar 7 is an annular sleeve 12 loose on the member 6. Between the flange of the sleeve 12 and the collar 7 is disposed an annular friction washer or plate 13 of leather, rubber, or any composition material having a high coefficient of friction and suitable wearing qualities. The member 12 is provided with a plurality of inclined surfaces 14, disposed opposite complementary surfaces on the pulley. The pulley 9 may be belt-driven from any suitable source, such as from a line shaft or directly from an individual power unit, such for example as a gas engine as illustrated in Fig. 1.

In operation, the pulley 9 is revolved in a counter-clockwise direction viewing Fig. 1. The inclined surfaces on the pulley will bear against those on the member 12, forcing the latter longitudinally on the member 6 into frictional engagement with the friction plate 13. As the pressure on the member 12 increases a gradual frictional connection will be established between the parts 7 and 12, thereby gradually transmitting the power from the pulley to the separator shaft 5. So long as there is resistance from the shaft 5, this driving connection will be maintained. When, however, the pulley drive is discontinued or for any reason the engine should slow down, the longitudinal pressure or thrust on the part 12, due to the inclined surfaces, will be immediately released and frictional connection between the driving and driven parts will be broken. From the foregoing, it will be evident that the driving connection is automatically established and broken, and there is such elasticity in its action as not to cause jerky action which is detrimental to the operation of cream separators. It will also be noted that the construction is exceedingly simple, compact and readily adapted to the ordinary cream separator.

It is believed that the foregoing conveys a clear understanding of the principles and operation of my improvements, and it should be understood that while I have illustrated one practical working embodiment, various changes might be made in the construction and arrangement without departing from the spirit and scope of the invention as expressed in the appended claim, in which—

I claim:

A power pulley attachment for a cream separator or other machine adapted to be driven either by a hand crank or by power and having a projecting driving shaft, comprising a stub shaft having a bore at one end for the reception of said projecting shaft and permitting quick mounting and dismounting of the stub shaft, means for detachably securing the stub shaft to said projecting shaft, a pulley revoluble on said stub shaft, means preventing outward displacement of the pulley on the stub shaft, an annular collar or the like fixed to the inner end of the stub shaft, a sleeve loose on the stub shaft and interposed between said collar and the pulley, inclined surfaces between the hub of the pulley and said sleeve, and a friction surface between the sleeve and annular collar for permitting frictional engagement therebetween when the sleeve is moved longitudinally on the stub shaft by reason of rotation of the pulley in such direction as will cause its inclined faces to press inwardly the complementary faces on the sleeve to effect said frictional engagement.

ARTHUR NEIL BRECKENRIDGE.